United States Patent [19]
Brown

[11] 3,873,114
[45] Mar. 25, 1975

[54] PORTABLE CONTAINER APPARATUS

[76] Inventor: Rilma L. Brown, 3148 N. Central Ave., Indianapolis, Ind.

[22] Filed: Dec. 14, 1973

[21] Appl. No.: 424,863

[52] U.S. Cl. ................ 280/30, 280/79.2, 297/118, 312/237
[51] Int. Cl. ............................................ B62b 3/02
[58] Field of Search ............ 280/36 C, 79.2, 47.35, 280/30; 296/22, 23 F; 312/250, 237; 297/118, 217, 378, 380; 109/129

[56] References Cited
UNITED STATES PATENTS

| | | | |
|---|---|---|---|
| 1,562,371 | 11/1925 | Shanks | 312/327 X |
| 2,058,682 | 10/1936 | Green | 312/250 X |
| 2,603,500 | 7/1952 | Messier | 280/30 |
| 2,726,913 | 12/1955 | Freeman | 280/79.2 X |
| 3,180,654 | 4/1965 | Westfall | 280/30 |
| 3,771,848 | 11/1933 | Claywell | 312/237 X |

*Primary Examiner*—David Schonberg
*Assistant Examiner*—Terrance L. Siemens
*Attorney, Agent, or Firm*—Woodard, Weikart, Emhardt & Naughton

[57] ABSTRACT

A wheeled container having a plurality of compartments, each compartment being provided with a lid and one compartment being thermally insulated. Hingedly attached to the container on opposite sides are a pair of platforms which may be folded over the container or unfolded into a horizontal position, each platform having a plurality of folding legs for support.

9 Claims, 2 Drawing Figures

PATENTED MAR 25 1975 3,873,114

PORTABLE CONTAINER APPARATUS

BACKGROUND OF THE INVENTION

1. Field of the Invention

The invention is in the field of land vehicles with adjustable and/or foldable handles.

2. Description of the Prior Art

When hunting, fishing or camping, a person often has a great deal of gear and supplies which must be transported to a desired location from a parked motor vehicle. Also, upon arriving at the desired location, a person often requires a work surface and/or seating. A fisherman, for example, may often find it necessary to make two or more trips from his car to a fishing area in order to carry his bait, tackle, rods and reels, food, chair or stool, and other paraphernalia, and he may still arrive at the fishing area without an adequate work surface.

When a fisherman, hunter, or camper carries his equipment and supplies to a desired location, both of his hands are usually occupied carrying the equipment and there is an increased danger of injury through falling on rough terrain. Additionally, an item which a camper, for example, might not readily have on hand at a desired location, remote from his motor vehicle, is a table-like work surface.

Wheeled containers have been provided which do not include the features of the present invention and are therefore not particularly useful to campers, hunters, and fishermen. Examples of such prior art wheeled containers are disclosed in U.S. Pat. Nos. 2,274,048 to Derman, No. 2,726,913 to Freeman, and No. 3,314,688 to Guegold.

SUMMARY OF THE INVENTION

An embodiment of the present invention is a portable container apparatus comprising a wheeled container, a first platform hingedly attached to the upper portion of a side of the container, having a first position on top of the container and having a second position extending horizontally beyond the container, and a plurality of legs attached to the platform, foldable adjacent the platform when the platform is in the first position, and unfoldable beneath the platform when the platform is in the second position.

It is an object of the present invention to provide a wheeled container, useful to fishermen, hunters and campers, which includes a hingedly attached platform having foldable legs.

Further objects and advantages of the present invention shall be apparent from the following figures and detailed description.

DESCRIPTION OF THE PREFERRED EMBODIMENT

Figure 1:
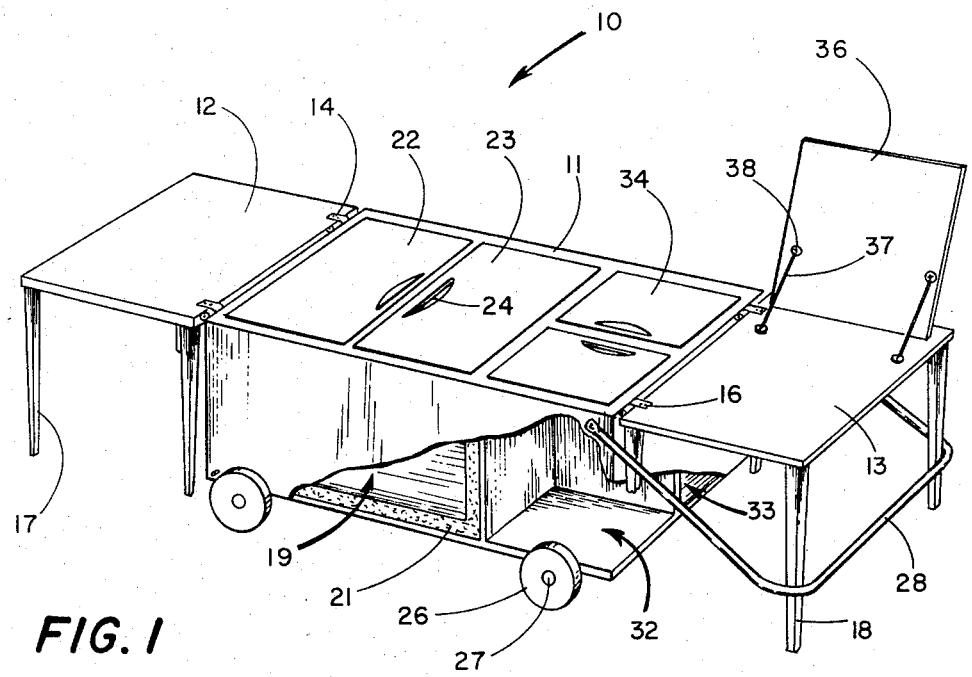
FIG. 1 shows the container apparatus embodying the present invention in an opened position with a portion removed.

For the purposes of promoting an understanding of the principles of the invention, reference will now be made to the embodiment illustrated in the drawings and specific language will be used to describe the same.

Figure 2:
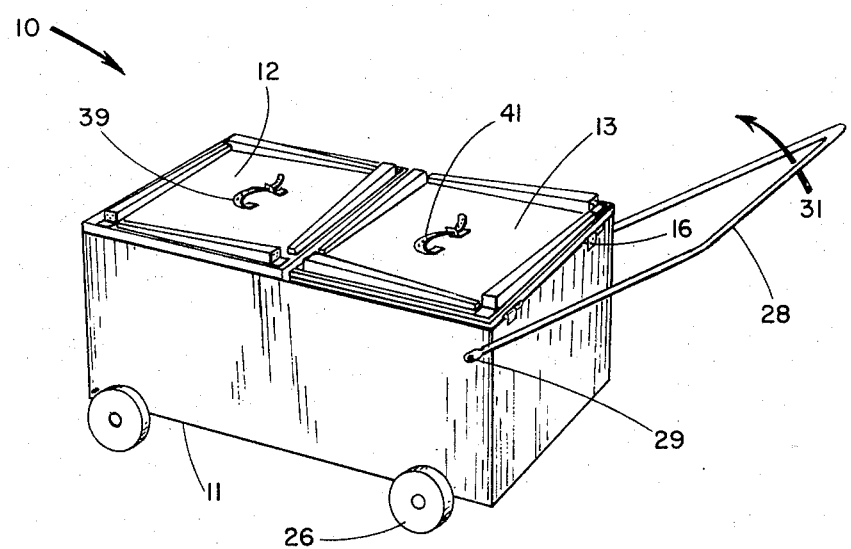
FIG. 2 shows the embodiment of FIG. 1 in a closed position.

Referring in particular to FIGS. 1 and 2, there is shown a portable container apparatus according to the present invention generally indicated as 10. Apparatus 10 comprises container 11, table platform 12 and chair platform 13. Platforms 12 and 13 are attached to container 11 by hinges such as 14 and 16 and each have a plurality of legs such as 17 and 18. Legs such as 17 and 18 are hingedly attached beneath platforms 12 and 13 and may be lowered to support the platforms as shown in FIG. 1 or folded into a storage position as shown in FIG. 2.

Container 11 has a main compartment 19 (FIG. 1) which is thermally insulated by insulating walls such as 21. Insulating covers 22 and 23 are provided for access to compartment 19, each cover position being provided with a recessed grip such as 24.

Wheels such as 26 are rotatably mounted on axles such as 27 attached to the bottom of container 11 for easy movement of container apparatus 10. A handle 28 is pivotally attached to container 11 by two bolts such as 29 (FIG. 2) and is available for pulling container apparatus 10, and handle 28 is free to be rotated in the direction of arrow 31 (FIG. 2) to a storage position around container 11. In the open position of FIG. 1, handle 28 may be positioned as shown around the legs of platform 13.

Container 11 includes uninsulated compartments 32 and 33, each having a lid such as 34 with a recessed handle portion. With the provision of compartments 32 and 33, perishable items may be stored in ice in insulated section 19, and other items may be conveniently placed in separate sections 32 and 33.

Seat platform 13 is provided with a back rest 36 which may be raised as shown in FIG. 1 and held in a slightly reclined position by cords such as 37 which are fastened at one end to platform 13 and at the other end to seat back 36 using screws such as 38. Seat back 36 may conveniently be folded down for placing the apparatus in a storage position as shown in FIG. 2. As can be seen in FIG. 2, platforms 12 and 13 may be rotated towards one another onto the top of container 11 pivoting about hinges such as 14 and 16. As also shown in FIG. 2, legs such as 17 and 18 on platforms 12 and 13 may be folded, and both platform portions are easily and conveniently maintained in a stored position on top of container 11.

Straps 39 and 41 (FIG. 2) are provided on the undersides of platforms 12 and 13 so that cargo such as fishing poles or guns may be laid across the top of container apparatus 10 and fastened in place. The hinges such as 14 and 16 attaching platforms 12 and 13 to container 11 are of a detachable type so that platforms 12 and 13 may be disconnected from container 11 and used at a location remote from the container. Container apparatus 10 is then easily reassembled and placed in a storage and transport position by reattaching platforms 12 and 13 at the hinges to container 11 and swinging the platforms toward one another as outlined above to the position of FIG. 2.

It can be seen that a wheeled container, useful to fishermen, hunters and campers, has been provided which includes a hingedly attached platform having foldable legs.

While there have been described above the principles of this invention in connection with specific apparatus, it is to be clearly understood that this description is made only by way of example and not as a limitation in the scope of the invention.

The invention claimed is:

1. Portable container apparatus comprising:
 a wheeled container;
 a first platform hingedly attached to a first side of the container having a first position adjacent the container and having a second position extending essentially horizontally beyond the container;
 a leg attached to the platform foldable adjacent the platform when the platform is in the first position and unfoldable beneath the platform when the platform is in the second position; and
 a back rest member pivotally attached to the first platform and positionable extending above the first platform.

2. The apparatus of claim 1 in which the first position of the first platform is on top of the container.

3. The apparatus of claim 2 which further comprises means for detaching the first platform from the container.

4. The apparatus of claim 3 which further comprises:
 a second platform hingedly attached to a second side of the container having a first position on top of the container and having a second position extending essentially horizontally beyond the container; and
 a leg attached to the second platform foldable adjacent the second platform when the second platform is in the first position and unfoldable beneath the second platform when the second platform is in the second position.

5. The apparatus of claim 4 which further comprises first means for securing cargo attached to one of the platforms on the side available when the platform is in the first position.

6. The apparatus of claim 5 which further comprises a U-shaped handle member pivotally attached to the container and positionable in a first position beyond a side of the container and in a second position on top of the container.

7. The apparatus of claim 6 in which the container includes a plurality of compartments.

8. The apparatus of claim 7 in which one of the compartments in the container is thermally insulated.

9. The apparatus of claim 8 which further comprises a plurality of lids attached to the container, one lid being fitted above the insulated compartment and being insulated.

* * * * *